United States Patent
Lee (10) Patent No.: US 6,714,912 B2
(45) Date of Patent: Mar. 30, 2004

(54) DIGITAL CORDLESS PHONE SYSTEM FOR IMPROVING DISTANCE OF SPEECH COMMUNICATION USING ERROR CONCEALMENT AND METHOD THEREOF

(75) Inventor: Yoon-yung Lee, Kyungki-do (KP)

(73) Assignee: Samsung Electronics, Co., Ltd., Suwon (KR)

( * ) Notice: Subject to any disclaimer, the term of this patent is extended or adjusted under 35 U.S.C. 154(b) by 405 days.

(21) Appl. No.: 09/772,208

(22) Filed: Jan. 29, 2001

(65) Prior Publication Data

US 2001/0011216 A1 Aug. 2, 2001

(30) Foreign Application Priority Data

Jan. 28, 2000 (KR) ............................................ 2000-4254
Dec. 22, 2000 (KR) ........................................ 2000-80707

(51) Int. Cl.[7] .............................................. G10L 19/00
(52) U.S. Cl. ....................................... 704/500; 375/219
(58) Field of Search ........................ 359/113; 375/219; 714/755; 704/503, 500

(56) References Cited

U.S. PATENT DOCUMENTS

| | | | | |
|---|---|---|---|---|
| 5,636,264 A | * | 6/1997 | Sulavuori et al. ............ | 359/113 |
| 5,892,794 A | * | 4/1999 | Slegers ........................ | 375/219 |
| 5,951,709 A | * | 9/1999 | Tanaka ......................... | 714/755 |
| 6,477,502 B1 | * | 11/2002 | Ananthpadmanabhan et al. ........................... | 704/503 |

\* cited by examiner

Primary Examiner—Richemond Dorvil
Assistant Examiner—Kinari Patel
(74) Attorney, Agent, or Firm—F. Chau & Associates, LLC (57) ABSTRACT

A digital cordless phone system and a communication method for improving the distance of speech communication using error concealment are provided. The digital cordless phone system has a base unit and a remote unit, and each of the base and remote units has a first codec, a data processing unit, a controller, a modem and a switch. The first codec encodes voice data in a first encoding mode, and decodes the data encoded in the first encoding mode in a first decoding mode. The data processing unit having a second codec encodes the voice data in a second encoding mode, adds an error-detection code to encoded data to indicate existence of an error in the encoded data, removes the error-detection code from encoded data received from one of the base unit and the remote unit in the second encoding mode, performs error concealment with respect to the encoded data from which the error-detection code is removed, and provides error concealed data to the second codec to decode the error concealed data in a second decoding mode. The controller generates a selection signal for changing an encoding mode of the digital cordless phone system in response to a signal representing strength of a signal received from the base unit or the remote unit. The modem modulates data output from the first codec or the data processing unit, and demodulates data remotely received from the base unit or the remote unit. The switch connects the first codec or the data processing unit to the modem in response to the selection signal.

18 Claims, 6 Drawing Sheets

DIGITAL CORDLESS PHONE SYSTEM FOR IMPROVING DISTANCE OF SPEECH COMMUNICATION USING ERROR CONCEALMENT AND METHOD THEREOF

BACKGROUND OF THE INVENTION

1. Field of the Invention

The present invention relates to a digital wireless communication system, and more particularly, to a digital cordless phone system which changes encoding and decoding methods according to the distance of speech communication between a remote unit and a base unit, and a method thereof.

2. Description of the Related Art

A digital wireless communication system provides better communication quality than that provided by a conventional analog wireless communication system. Particularly, a digital cordless phone system, which replaces the existing analog cordless phone system, uses encoding methods such as adaptive differential pulse code modulation (ADPCM) to provide a better voice quality via a low transmission rate or low transmission band, and uses a modem in transmitting encoded voice data. This digital cordless phone system provides diverse advantages. For example, the digital system provides tapping prevention function using encryption and an excellent speech quality within a preset speech communication distance. If the distance of current speech communication between a base set and a handset of the digital cordless phone system is within a preset speech communication distance, that is, within a speech communication distance having low bit-error rate, good speech quality can be maintained. Here, the base set and the handset are, for example, a base unit and a remote unit, respectively, of a digital cordless phone.

However, if the current speech communication distance is beyond the preset speech communication distance, bit errors increase due to degraded signal-to-noise ratio (SNR), and the speech communication quality provided by the digital cordless phone system is reduced.

Therefore, a need exists for a digital cordless phone system which provides good speech communication quality even when the current speech communication distance is beyond the preset speech communication distance.

SUMMARY OF THE INVENTION

To solve the above and other problems, it is an object of the present invention to provide a digital cordless phone system which can improve (or lengthen) the distance of speech communication between a base set and a handset, by using a first encoding method if the speech communication distance between the base set and the handset is within a preset speech communication distance, and using a second encoding method and error concealment if the speech communication distance between the base set and the handset is beyond the preset speech communication distance.

It is another object of the present invention to provide a voice communication method applicable to the digital cordless phone system to maintain a good quality in the speech communication regardless of the communication distance between the base set and handset.

To accomplish the above and other objects of the present invention, there is provided a digital cordless phone system having a base unit and a remote unit, in which each of the base unit and the remote unit having a first codec for encoding voice data in a first encoding mode and decoding data encoded in the first encoding mode in a first decoding mode; a data processing unit having a second codec for encoding the voice data in a second encoding mode, wherein the data processing unit adds an error-detection code to encoded data to indicate existence of an error in the encoded data, removes the error-detection code from encoded data received from one of the base unit and the remote unit, performs error concealment with respect to the encoded data from which the error-detection code is removed, and provides error concealed data to the second codec to decode the error concealed data in a second decoding mode; a controller for generating a selection signal for changing an encoding mode of the digital cordless phone system in response to a signal representing strength of a signal received from the base unit or the remote unit; a modem for modulating data output from the first codec or the data processing unit, and demodulating data remotely received from the base unit or the remote unit; and a switch for connecting the first codec or the data processing unit to the modem in response to the selection signal.

To accomplish another object of the present invention, there is also provided a voice communication method between a base unit and a remote unit in a digital cordless phone system, the method having the steps of (a) determining whether a current speech communication distance between the base unit and the remote unit is beyond a preset distance of speech communication; (b) if it is determined that the current speech communication distance is within the preset distance of speech communication, encoding voice data in a first encoding mode and decoding receiving data in a first decoding mode corresponding to the first encoding mode to restore the voice data; and (c) if it is determined in the step (a) that the current speech communication distance is beyond the preset distance of speech communication, encoding the voice data in a second encoding mode, adding an error-detection code to encoded data, removing the error-detection code from receiving data, and decoding the receiving data from which the error-detection code is removed in a second decoding mode corresponding to the second encoding mode to restore the voice data.

BRIEF DESCRIPTION OF THE DRAWINGS

The above and other objects and advantages of the present invention will become more apparent by describing in detail preferred embodiments thereof with reference to the attached drawings in which.

DETAILED DESCRIPTION OF PREFERRED EMBODIMENTS

Hereinafter, embodiments of the present invention will be described in detail with reference to the attached drawings.

The present invention is not restricted to the following embodiments, and many variations are possible within the spirit and scope of the present invention. The embodiments of the present invention are provided in order to more completely explain the present invention to anyone skilled in the art.

Figure 1:
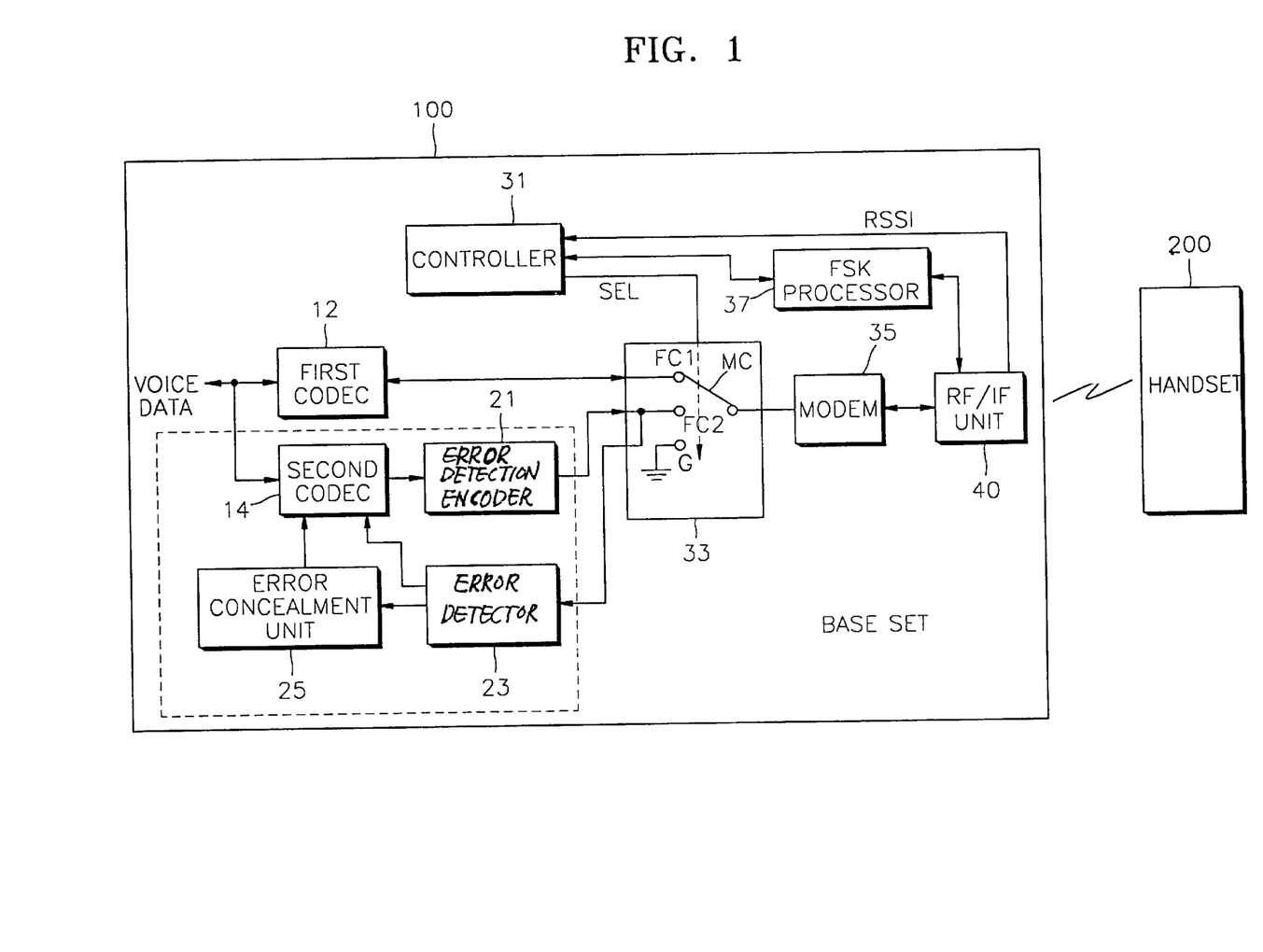
FIG. 1 illustrates a digital cordless phone system for improving the distance of speech communication using error concealment according to an embodiment of the present invention.

FIG. 1 is a block diagram for explaining a digital cordless phone system for improving the distance of speech communication according to a preferable embodiment of the present invention. Referring to FIG. 1, the digital cordless phone system has a base set 100 and a handset 200. The base set 100 has a first coder-decoder ("codec") 12, a data processing unit 150, a controller 31, a switch 33, a frequency shift keying (FSK) processor 37, a modem 35 and a radio frequency/intermediate frequency (RF/IF) unit 40. Here, the data processing unit 150 has a second codec 14, an error detection encoder 21, an error detector 23 and an error concealment unit 25.

The first codec 12 is used for encoding or decoding voice data. In the embodiment of the present invention, the first codec 12 and the second codec 14 encode or decode input data using adaptive differential pulse code modulation (ADPCM). The first codec 12 encodes input voice data in units of a voice sample using the ADPCM and generates encoded data having, for example, a 24 Kbps transmission rate. If encoded data having the 24 Kbps transmission rate is input, the first codec 12 decodes this data using the ADPCM and generates voice data.

The data processing unit 150 is a block for changing an encoding mode into a second codec mode if the speech communication distance between the base set and handset is beyond a preset speech communication distance. The second codec 14 encodes input voice data in units of a voice sample using the ADPCM. Data encoded in a second encoding mode is represented by a second bit number, which is smaller than a first bit number which is used for representing data encoded in a first encoding mode. The second codec 14 generates encoded data having, for example, a 16 Kbps transmission rate, and decodes encoded data having the 16 Kbps transmission rate using the ADPCM and generates voice data. The error detection encoder 21 encodes the encoded data output from the second codec 14 with an error-detection code to indicate existence of an error in a corresponding voice sample. For example, the error detection encoder 21 inserts an error detection code, for example, a 1-bit parity bit, into encoded data in units of each voice sample.

The error detector 23 determines whether or not a corresponding voice sample has an error, based on an error detection code contained in error-detection-encoded data received through the switch 33 from the modem 35, and outputs encoded data, of which error detection code is removed. The error concealment unit 25 performs error concealment for encoded data of a voice sample having an error, output from the error detector 23, and provides the result to the second codec 14.

The controller 31, in response to a received signal strength indicator (RSSI) signal output from the RF/IF unit 40, generates a selection signal (SEL) for controlling the switch 33 when the speech communication distance between the base set 100 and the handset 200 changes. Also, the controller 31 controls the operation of the FSK processor 37.

The switch 33 is controlled by the selection signal (SEL) of the controller 31, and operates to connect the modem 35 with the first codec 12 or the data processing unit 150. The switch 33 internally has a first fixed contact (FC1) connected to the first codec 12, a second fixed contact (FC2) connected to both the output terminal of the error detection encoder 23 and the input terminal of the error detector 23, and a ground terminal (G). The switch 33 also has a movable contact (MC) controlled by a selection signal (SEL) of the controller 31. The movable contact (MC) is connected to the modem 35. The modem is connected to the RF/IF unit 40. The modem 35 performs 8 phase shift keying (PSK) modulation of data having a 24 Kbps transmission rate, and modulates data input through the switch 33 and demodulates data input from the RF/IF unit 40.

The RF/IF unit 40 converts and amplifies a signal in a base band into a signal having a radio frequency (RF), and converts an RF signal into a base band signal. The RF/IF unit 40 converts the frequency of the modulated data provided from the modem 35 into an intermediate frequency (IF) and a radio frequency (RF) in sequence, and for an RF signal provided from the handset 200, converts the frequency of the RF signal into an intermediate frequency and base band in sequence. The RF/IF unit 40 also generates an RSSI signal which indicates the strength of a received signal. The RSSI signal is used to generate a selection signal (SEL) for selecting one of 'a first codec mode' and 'a second codes mode' by the controller 31.

In the present invention, during the second codec mode, the second codec 14, the error detection encoder 21, the error detector 23, and error concealment unit 25 of the data processing unit 150 of FIG. 1 are used for data processing.

The FSK processor 37 is controlled by the controller 31. The FSK processor 37 generates FSK data to the RF/IF unit 40 or detects FSK data from output data of the RF/IF unit 40, and provides information contained in the FSK data to the controller 31. Here, the FSK data may be data for indicating that an encoding mode changes.

The base set 100 and handset 200 communicate with each other using an RF signal, and except that the base set 100 has an interface circuit (not shown) to be connected to ISDN/PSTN networks, both have almost the same structures. This difference is clear to a person skilled in the field of this technology, and therefore explanation of the detailed structure of the handset 200 will be omitted.

If a telephone user who converses using the handset 200 roams around, the distance of speech communication between the base set 100 and the handset 200 can be beyond a preset speech communication distance, that is, a speech communication distance having rare bit errors. A case in which the base set 100 first recognizes this situation will now be explained referring to FIG. 2.

Figure 2:
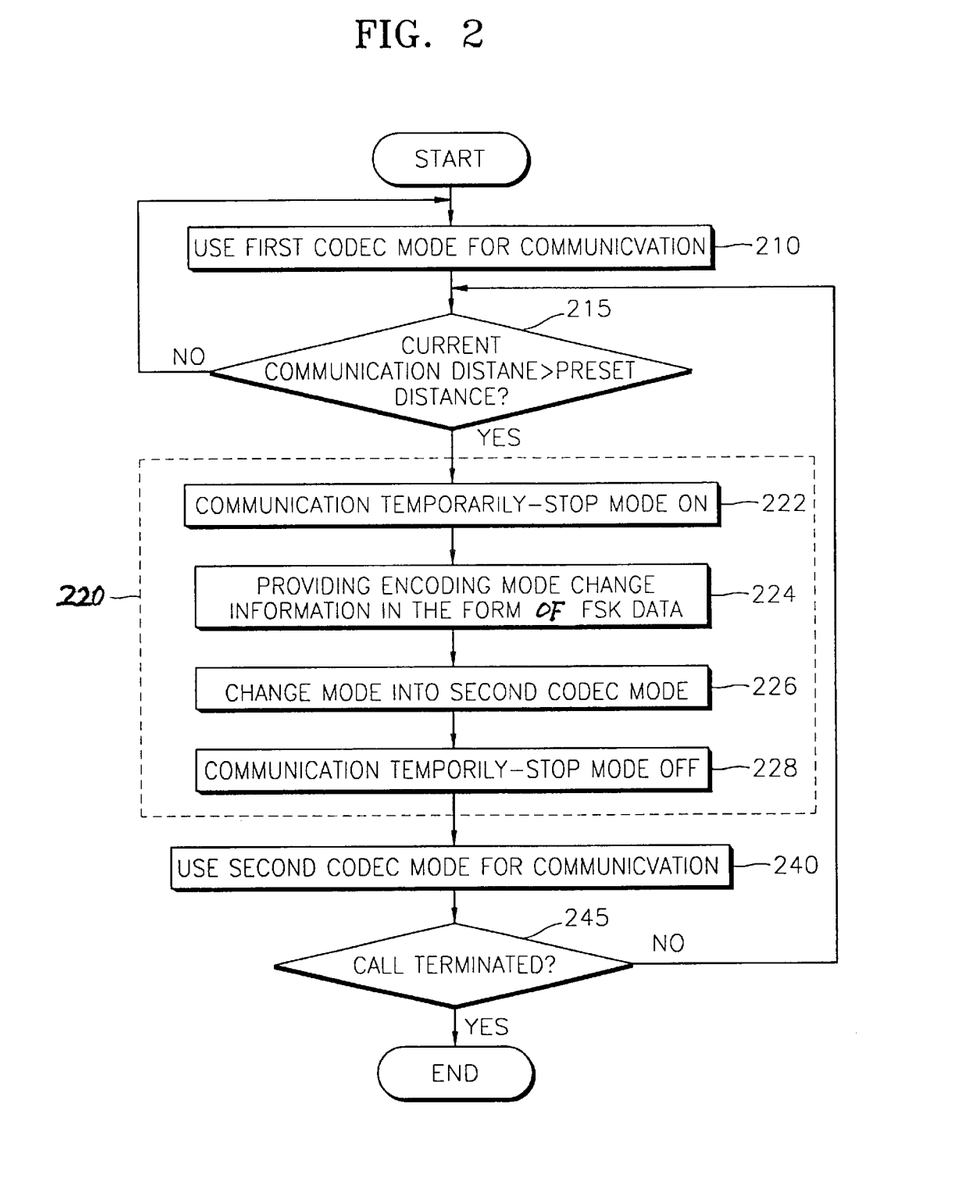
FIG. 2 is a flowchart for explaining operation of the digital cordless phone system in FIG. 1.

FIG. 2 is a flowchart for explaining the operation in case when the base set 100 recognizes that the distance of speech communication with the handset 200 changes farther. Referring to FIGS. 1 and 2, the base set 100 operates in a first codec mode to process data for communications at first in step 210. In the operation in the first codec mode, the controller 31 controls the switch 33 so that data encoded by the first codec 12 can be provided to the modem 35. At this time, the first codec 12 encodes input voice data to generate encoded data having a 24 Kbps transmission rate. The switch 33 makes the movable contact MC connected to the first fixed contact (FC1) in response to the selection signal (SEL) of the controller 31. Therefore, data output from the first codec 12 passes through the switch 33, the modem 35, and the RF/IF unit 40 in sequence, and an RF signal, which is generated as the result, is transmitted to the handset 200 through a public network. If the RF signal transmitted from the handset 200 is received in the RF/IF unit 40 of the base set 100, the encoded data obtained by signal processing of the RF/IF unit 40 and the modem 35 has a 24 Kbps transmission rate. This data is provided to the first codec 12 through the switch 33. The first codec 12 decodes the encoded data to generate voice data.

After the step 210, the controller 31 determines whether or not the speech communication distance is beyond the preset distance of speech communication, based on the strength of an RSSI signal provided from the RF/IF unit 40 in step 215. If it is determined that the current distance of speech communication, that is, the communicating distance between the base set 100 and the handset 200, is within the preset distance of speech communication, the controller 31 controls the switch 33 so that the base set 100 operates in the first codec mode. If it is determined that the current distance of speech communication is beyond the preset distance of speech communication, the step 220 for changing an encoding mode is performed. That is, the controller 31 turns on 'a communication-temporarily-stop mode' in step 222. The communication-temporarily-stop mode is to prevent voice data, which has bad speech quality, from being provided to subscribers using the base set 100 and handset 200, because if the current distance of speech communication is beyond the preset distance of speech communication, encoding or decoding data using the first codec 12 degrades the speech quality. While the communication-temporarily-stop mode is turned on, the controller 31 generates a selection signal (SEL) for controlling the switch 33 so that the movable contact (MC) of the switch 33 is connected to the ground terminal (G).

Then, in order to give information that the encoding mode for communication is to change into a second codec mode to handset 200, the controller 31 controls the FSK processor 37, and the FSK processor 37 generates FSK data indicating that the encoding mode is to change into the second codec mode in step 224. The controller 31 changes the encoding mode into the second codec mode in step 226. While the step 226 is performed, the controller 31 generates a selection signal (SEL) so that the movable contact (MC) can be connected to the fixed contact (FC2). Then, the controller 31 turns off the communication-temporarily-stop mode so that the base set 100 can communicate with the handset 200 in step 228. Therefore, the base set 100 operates in the second codec mode in step 240.

The controller 31 determines whether or not communications between the base set 100 and the handset 200 continue, using the RSSI signal in step 245. If the call connection is not terminated, the step 215 is performed again, and the steps 215 through 245 are repeated until the call connection is terminated.

Figure 3:
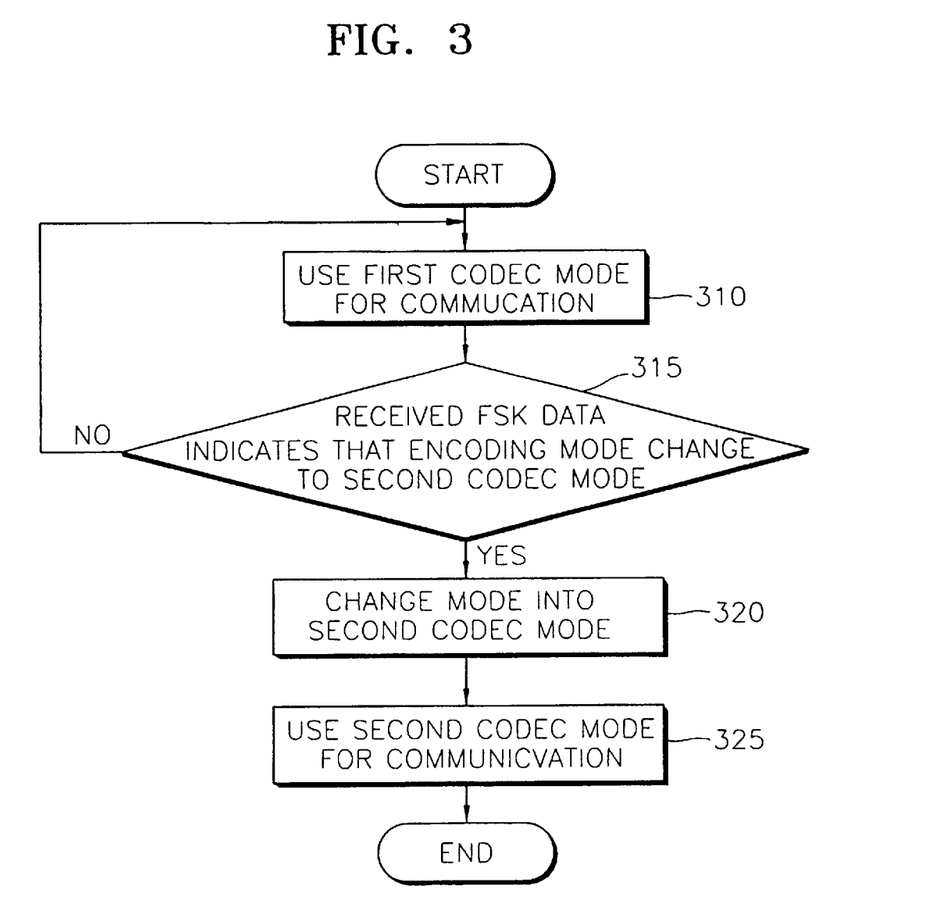
FIG. 3 is a flowchart for explaining operation of the digital cordless phone system when receiving data indicating a change of a codec mode of the system.

FIG. 3 is a flowchart for explaining an operation of the base set when the base set receives from the handset FSK data indicating that an encoding mode changes into a second codec mode from a first codec mode. Referring to FIGS. 1 and 3, the base set 100 operates in the first codec mode for communications at first in step 310. The controller 31 determines whether or not the FSK data indicates that the encoding mode is to change into the second codec mode, based on information detected from the FSK data by the FSK processor 37 in step 315. If the FSK data indicates that the encoding mode is to change into the second codec mode, the controller 31 performs the step 320. That is, in the step 320, the controller 31 generates a selection signal (SEL) for changing the encoding mode into the second codec mode and the switch 33 operates so that the modem 35 can be connected to the data processing unit 150. Therefore, the base set 100 operates in the second codec mode for communications in step 325.

Figure 4:
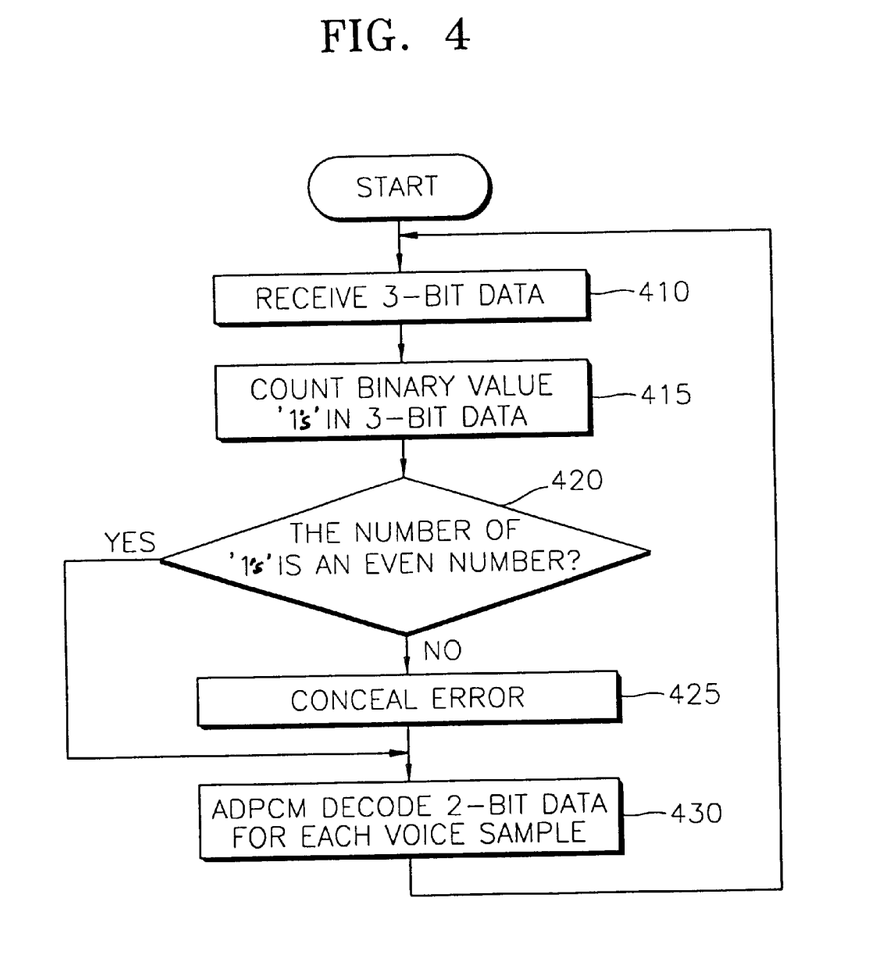
FIG. 4 is a flowchart for explaining operation of the data processing unit in FIG. 1.

FIG. 4 is a flowchart for explaining error concealment and decoding of the encoded data performed by the base set 100 or the handset 200 operating in the second codec mode. Referring to FIGS. 1 and 4, the operations of the second codec 14, the error detector 23 and the error concealment unit 25 will be explained when it is assumed that an even parity is used as an error detection code and data obtained by ADPCM processing of each voice sample is represented with 3 bits. First, if the error detector 23 receives error-detection encoded 3-bit data through the switch 33 from the modem 35 in step 410, the error detector 23 counts the number of binary value 1's existing in the 3-bit data in step 415. Here, 3-bit data of which binary value 1's are counted corresponds to each voice sample, and is obtained by encoding the voice sample to have a 16 Kbps transmission rate and inserting an error detection code.

The error detector 23 determines whether or not the counted value obtained in the step 415, that is, the number of binary value 1's, is an even number in step 420. If it is determined that the counted value is an odd number in the step 420, the error detector 23 determines that an error is added to the error-detection encoded data received from the switch 33. Therefore, the error detector 23 removes a parity bit, which is the error detection code, from the error-detection encoded data, before providing the data to the error concealment unit 25. As a result, encoded data which is represented by 2-bit data for each voice sample is provided to the error concealment unit 25. The error concealment unit 25 performs an error concealment operation for data provided from the error detection unit 23 in step 425. Error concealment operation is performed for 2-bit data corresponding to the current sample, through interpolation using data of samples adjacent to the current sample having an error. Error concealed data is provided to the second codec 14 of the data processing unit 150.

If it is determined that the counted value is an even number in the step 420, the error detector 23 determines that the received error-detection encoded data has no error. In this case, the error detector 23 removes a parity bit and provides encoded data, which is represented by 2-bit for each voice sample, to the second codec 14. In step 430, the second codec 14 decodes encoded data provided from the error concealment unit 25 or the error detector 23, to generate voice data. Therefore, the second codec 14 restores voice data from 2-bit data for each voice sample.

The above embodiments of the present invention have been explained in a situation in which the speech communication distance changes farther beyond the preset distance of speech communication.

Figure 5:
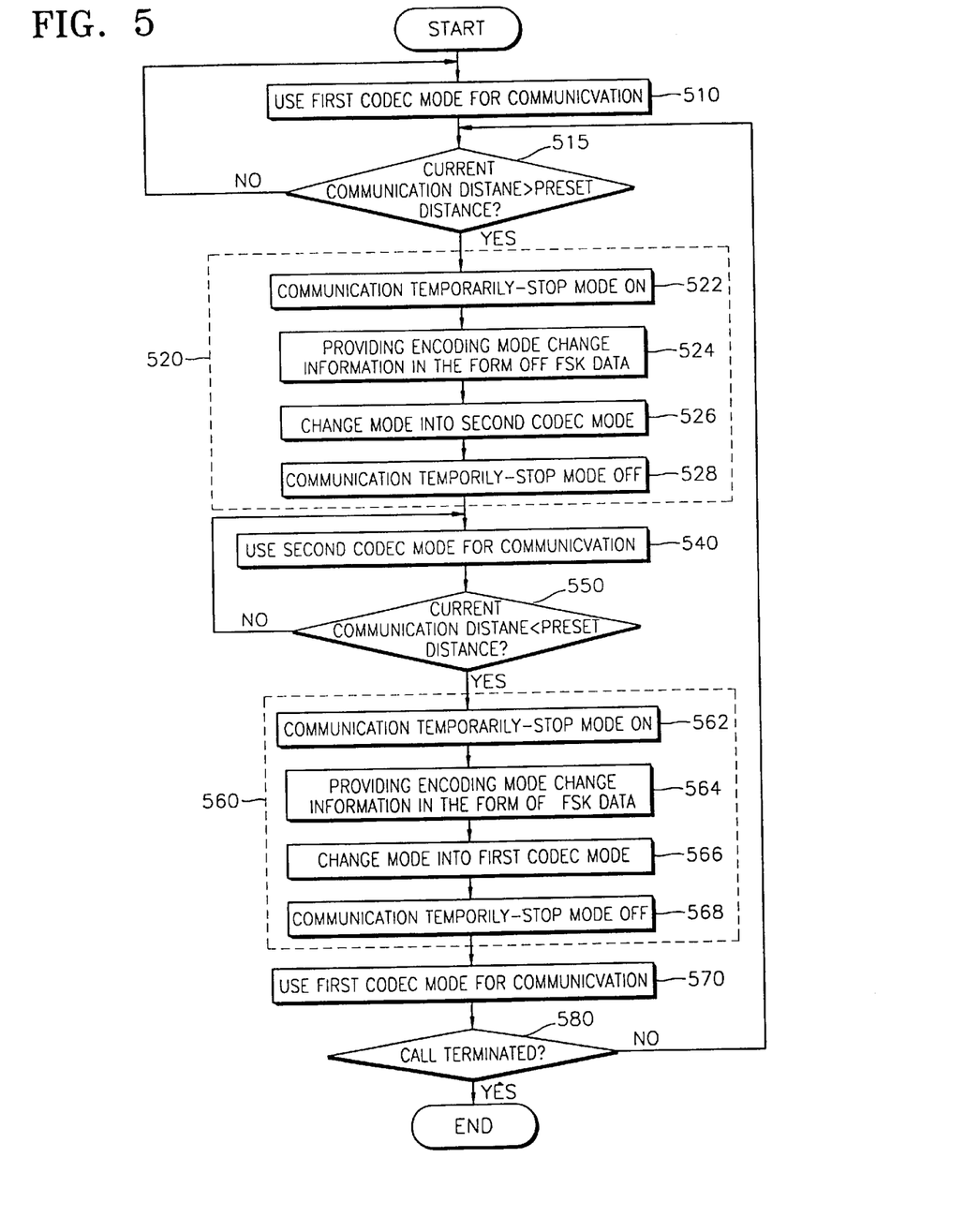
FIG. 5 is a flowchart for explaining operation of the digital cordless phone system in FIG. 1 when the speech communication distance changes.

FIG. 5 is a flowchart for explaining a situation in which the speech communication distance comes into within the preset distance of speech communication, after the speech communication distance was beyond the preset distance of speech communication. In FIG. 5, the steps 510 through 540 are the same as the steps 210 through 240 of FIG. 2, in which, as described above, if the speech communication distance gets farther beyond the preset distance of speech communication, the base set 100 communicates with the handset 200 using the second codec mode.

During the communication in the second codec mode, if it is determined that the speech communication distance between the base set 100 and the handset 200 is within the preset distance of speech communication in step 550, the base set 100 and the handset 200 communicate with each other in the first codec mode after an encoding mode change process in step 560.

Referring to FIGS. 1 and 5, the controller 31 turns on 'a communication-temporarily-stop mode' in step 562. While the communication-temporarily-stop mode is turned on, the controller 31 generates a selection signal (SEL) for controlling the switch 33 so that the movable contact (MC) of the switch 33 is connected to the ground terminal (G). Then, the controller 31 controls the FSK processor 37 to provide information, indicating that the encoding mode for the communication is to change into the first codec mode, to the handset 200. Therefore, the FSK processor 37 generates FSK data indicating that the encoding mode is to change into the first codec mode in step 564. The controller 31 changes the encoding mode into the first codec mode in step 566, and during the step 566, generates a selection signal (SEL) so that the movable contact (MC) is connected to the fixed contact (FC1). Then, the controller 31 turns off the communication-temporarily-stop mode so that the base set 100 can communicate with the handset 200 in step 568. Therefore, the base set 100 again operates in the first codec mode in step 570.

The controller 31 determines whether or not the communication between the base set 100 and the handset 200 continues, using an RSSI signal in step 580, and if the call connection is not terminated, the steps 515 through 570 are repeated.

Figure 6:
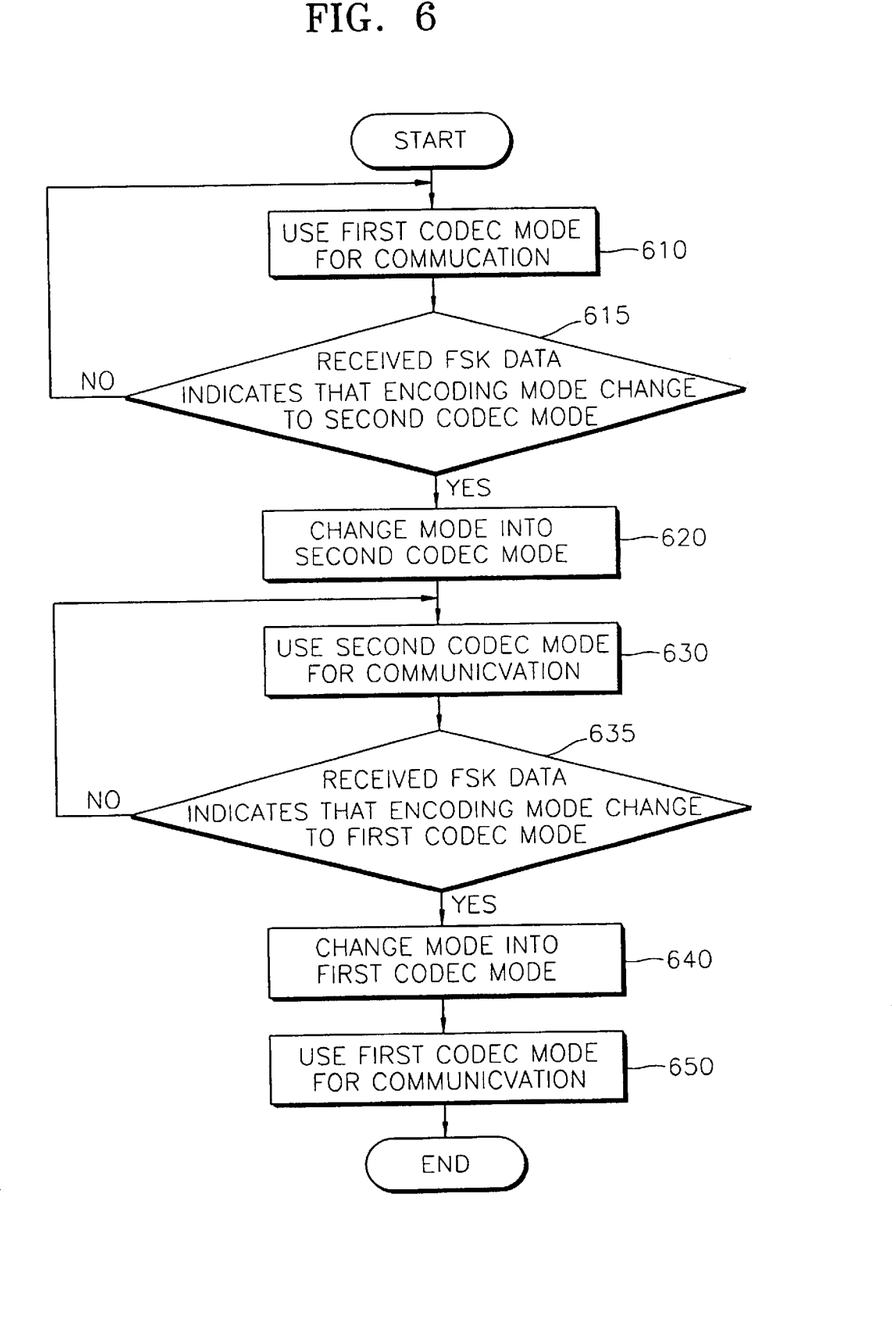
FIG. 6 is a flowchart for explaining operation of the digital cordless phone system when receiving data indicating changes between first and second codec modes of the system.

FIG. 6 is a flowchart for explaining the operation of the base set when the base set receives FSK data indicating that the encoding mode is to change into the second codec mode or the first codec mode, from the handset. The steps 610 through 630 of FIG. 6 are the same as the steps 310 through 325 of FIG. 3, in which, as described above, if the speech communication distance comes into again within the preset distance of speech communication after the encoding mode changed into the second codec mode, the base set changes the encoding mode again into the first codec mode.

Referring to FIGS. 1 and 6, the controller 31 determines whether or not the FSK data indicates that the encoding mode is to change into the first codec mode, based on information detected from the FSK data by the FSK processor 37 in step 635. If it is determined that the FSK data indicates that the encoding mode is to change into the first codec mode in the step 635, the controller 31 changes the encoding mode into the first codec mode in step 640, and the base set 100 operates in the first codec mode for communications in step 650.

As shown in FIGS. 5 and 6, the system according to the present invention uses the first codec mode if the current speech communication distance is within the preset distance of speech communication, and uses the second codec mode if the current speech communication distance is beyond the preset distance of speech communication, upon performing the comparison of the current speech communication distance with the preset distance of speech communication.

Also, in a case in which the handset 200 first recognizes that the current speech communication distance is beyond or within the preset distance, the digital cordless phone system of the present invention operates in the substantially same way as above described for the case where the base set 100 first recognizes the changes in the current speech communication distance.

Though the embodiment in FIG. 1 has been described with the separate blocks of the first codec 12, the data processing unit 150 having the second codec 14, the error-detection encoder 21, the error detector 23, and the error concealment unit 25, and the switch 33, these elements and functions thereof can be implemented in a single voice processor for processing base band data, which is clear to a person in the field of this technology. If the present invention is implemented in a single processor, the voice processor operates in the first codec mode or in the second code mode, as described above, according to a selection signal provided from the controller.

The preferred embodiments of the present invention have been explained with reference to the drawings. The specific terminologies used in the description of the embodiments are only to explain the present invention. Therefore, the present invention is not restricted to the above-described embodiments and many variations are possible within the spirit and scope of the present invention. The scope of the present invention is not determined by the description but by the accompanying claims.

As described above, the method according to the present invention provides the capability of maintaining the voice stable (i.e., good voice quality) even when the current distance of speech communication becomes farther than the preset distance and bit errors rapidly increase. Therefore, using the same modulation and demodulation method, the present invention can lengthen the speech communication distance compared to the conventional digital cordless phone system using only one encoding method.

What is claimed is:

1. A digital cordless phone system having a base unit and a remote unit, wherein each of the base unit and the remote unit comprising:

a first codec for encoding voice data in a first encoding mode and decoding data encoded in the first encoding mode in a first decoding mode;

a data processing unit having a second codec for encoding the voice data in a second encoding mode, the data processing unit for adding an error-detection code to encoded data to indicate existence of an error in the encoded data, removing the error-detection code from encoded data received from one of the base unit and the remote unit, performing error concealment with respect to the encoded data from which the error-detection code is removed, and providing error concealed data to the second codec to decode the error concealed data in a second decoding mode;

a controller for generating a selection signal for changing an encoding mode of the digital cordless phone system in response to a signal representing strength of a signal received from the base unit or the remote unit;

a modem for modulating data output from the first codec or the data processing unit, and demodulating data remotely received from the base unit or the remote unit; and a switch for connecting the first codec or the data processing unit to the modem in response to the selection signal.

2. The digital cordless phone system of claim 1, wherein the data processing unit comprises:

an error detection encoder for receiving data encoded in the second encoding mode and encoding the data with the error-detection code;

an error detector for determining whether a corresponding voice sample has an error, based on the error-detection code contained in the encoded data with the error-detection code, and outputting the encoded data from which the error-detection code is removed; and an error concealment unit for performing error concealment with respect to encoded data of a voice sample determined having an error, and outputting error concealed data to the second codec.

3. The digital cordless phone system of claim 1, wherein the first codec encodes the voice data in units of voice samples using adaptive differential pulse code modulation (ADPCM) and generates encoded data having a 24 Kbps transmission rate.

4. The digital cordless phone system of claim 1, wherein the second codec encodes the voice data in units of voice samples using ADPCM and generates encoded data having a 16 Kbps transmission rate.

5. The digital cordless phone system of claim 1, wherein the switch, in response to the selection signal, connects the first codec to the modem if a speech communication distance between the base unit and the remote unit is within a preset distance of speech communication, and connects the data processing unit to the modem if the speech communication distance is beyond the preset distance of speech communication.

6. The digital cordless phone system of claim 1, wherein for input voice data, data encoded in the second encoding mode is represented by a second bit number, which is smaller than a first bit number which is used for representing data encoded in the first encoding mode.

7. The digital cordless phone system of claim 1, wherein each of the base unit and the remote unit further comprises a frequency shift keying (FSK) processor for generating FSK data indicating that the encoding mode is to change into the first encoding mode or the second encoding mode.

8. The digital cordless phone system of claim 1, wherein the base unit and the remote unit are a base set and a handset, respectively, of the digital cordless phone system.

9. A voice communication method between a base unit and a remote unit in a digital cordless phone system, the method comprising the steps of:
   (a) determining whether a current speech communication distance between the base unit and the remote unit is beyond a preset distance of speech communication;
   (b) if it is determined that the current speech communication distance is within the preset distance of speech communication, encoding voice data in a first encoding mode and decoding receiving data in a first decoding mode corresponding to the first encoding mode to restore the voice data; and
   (c) if it is determined in step (a) that the current speech communication distance is beyond the preset distance of speech communication, encoding the voice data in a second encoding mode, adding an error-detection code to encoded data, removing the error-detection code from receiving data, and decoding the receiving data from which the error-detection code is removed in a second decoding mode corresponding to the second encoding mode to restore the voice data.

10. The voice communication method of claim 9, wherein the step (c) further comprises the steps of:
   (c1) encoding the voice data to be transmitted using the second encoding mode;
   (c2) performing error-detection encoding with respect to data encoded in the step (c1);
   (c3) performing error concealment for error-detection encoded data received remotely from the base unit or the remote unit; and
   (c4) restoring the voice data, of which error has been concealed in the step (c3), using the second decoding mode.

11. The voice communication method of claim 10, wherein the step (c1) further comprises the steps of:

(c11) performing a communication-temporarily-stop mode between the base unit and the remote unit;
(c12) transmitting predetermined data indicating that an encoding mode of the digital cordless phone system is to change, during the communication-temporarily-stop mode;
(c13) changing the encoding mode from the first encoding mode into the second encoding mode; and
(c14) turning off the communication-temporarily-stop mode, and encoding the voice data using the second encoding mode.

12. The voice communication method of claim 9, further including after the step (c) the step of changing an encoding mode of the digital cordless phone system from the second encoding mode into the first encoding mode, if the current speech communication distance comes into again within the preset distance of speech communication.

13. The voice communication method of claim 9, wherein if the current speech communication distance changes to exceed the preset distance of speech communication or to come into within the preset distance of speech communication, either the base unit or the remote unit that recognizes first the change provides information indicating the change to the other.

14. The voice communication method of claim 9, wherein for voice data, data encoded in the second encoding mode is represented by a second bit number, which is smaller than a first bit number which is used for representing data encoded in the first encoding mode.

15. A program storage device readable by a machine, tangibly embodying a program of instructions executable by the machine to perform method steps for managing a plurality of data points in a multi-dimensional space, the method comprising the steps of:
   performing communication in a first codes mode between a base unit and a remote unit of a digital cordless phone system;
   detecting if a current communication distance between the base and remote units is beyond a preset communication distance;
   generating a first information to change a coding-decoding mode of the digital cordless phone system from the first codec mode to a second codec mode, when the current communication distance is beyond the preset communication distance; and
   performing the communication in the second codec mode between the base and remote units upon receiving the first information.

16. The program storage device of claim 15, further including instructions for performing the steps of:
   detecting if the current communication distance is within the preset communication distance;
   generating a second information to change the coding-decoding mode from the second codec mode to the first codec mode, when the current communication distance is within the preset communication distance; and
   performing the communication in the first codec mode between the base and remote units upon receiving the second information.

17. The program storage device of claim 15, wherein the instructions for performing the communication in the second codec mode comprise instructions for performing the steps of:
   encoding voice data and adding an error-detection code to generate and remotely transmit encoded data with the error-detection code;

receiving the encoded data remotely transmitted and detecting an error from the encoded data using the error-detection code;

performing error concealment with respect to the encoded data from which the error is detected, to generate error concealed data; and decoding the error concealed data to restore the voice data.

18. The program storage device of claim 17, wherein the instructions for detecting an error comprise instructions for performing the steps of:

counting a number of a predetermined binary value in the encoded data;

determining if the number counted in the counting step is an odd number;

removing the error-detection code from the encoded data when the number counted is the odd number; and providing the encoded data from which the error-detection code is removed, to perform the error concealment.

* * * * *